UNITED STATES PATENT OFFICE.

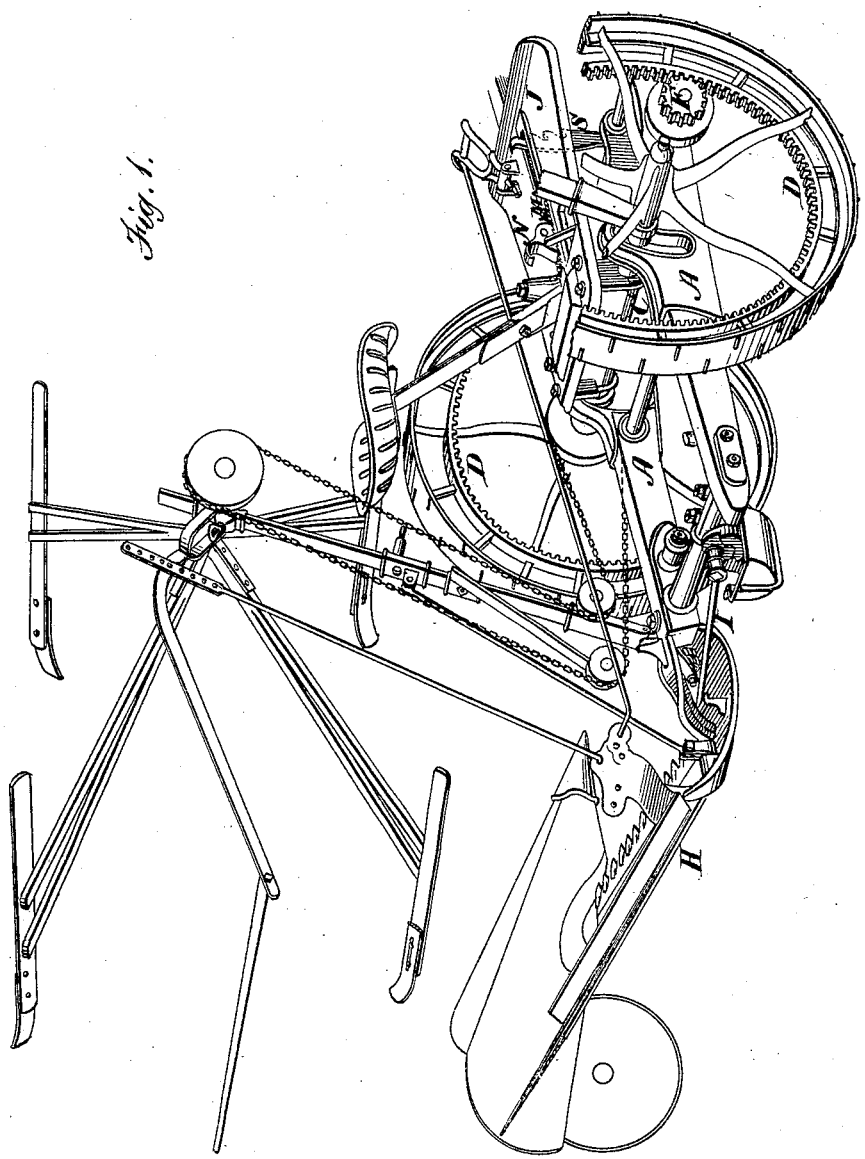

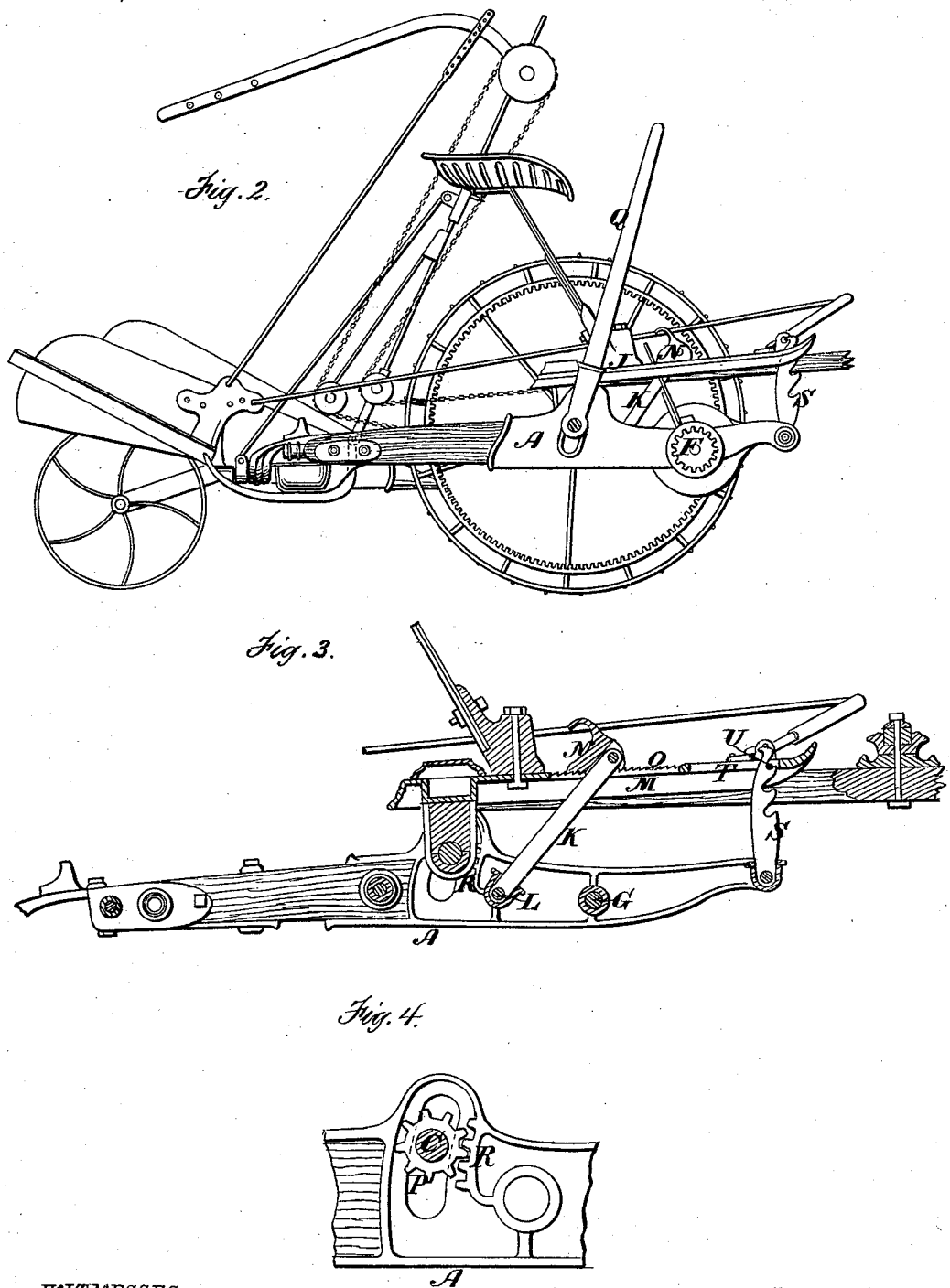

WILLIAM F. COCHRANE, OF LA FAYETTE, INDIANA.

IMPROVEMENT IN HARVESTERS.

Specification forming part of Letters Patent No. 149,444, dated April 7, 1874; application filed December 15, 1873.

CASE A.

*To all whom it may concern:*

Be it known that I, WILLIAM F. COCHRANE, of La Fayette, in the county of Tippecanoe and State of Indiana, have invented a new and useful Harvesting-Machine; and I do hereby declare the following to be a full and exact description of the same, reference being had to the accompanying drawings, forming part of this specification, in which—

Figure 1, Sheet 1, is a perspective view of a harvesting-machine constructed in accordance with my invention. Fig. 2, Sheet 2, is a side elevation of the same, with the outer driving-wheel removed. Fig. 3, Sheet 2, is a longitudinal section of the main frame and tongue-bracket; and Fig. 4, Sheet 2, is an enlarged view of the segmental rack and lifting-pinion.

Similar letters of reference in the accompanying drawings denote the same parts.

My invention has for its object to improve the means for suspending the main frame and cutting apparatus between the wheels of a harvesting-machine. To this end it consists, first, in suspending the main frame of a harvester from the foot-board or tongue-bracket, by means of a traction-latch, at a point between the main axle and counter-shaft. By this means the weight of the cutting apparatus and rear end of the main frame are restored to the prime movers, to lessen the friction of the cutting apparatus upon the ground, and to increase the traction of the driving-wheels, while the whole frame is left free to play up and down, or oscillate upon the point of suspension, for the purpose of enabling the finger-bar to conform to the undulations of the ground, and the rear end of the main frame to mount and ride freely over stones and other obstructions. It also consists in adapting the traction-latch for adjustment, so that the weight of the cutting apparatus and rear end of the frame may be increased or diminished in proportion to the resistance offered by the grain to be cut, and so that the points of the guard-fingers may be elevated or depressed to adjust the height of cut, these various adjustments being effected without materially changing the weight upon the team. It also consists in the employment of an adjustable detent, in connection with the traction-latch, to regulate the position of the cutting mechanism for cutting the grain at the desired height.

In the accompanying drawings, A is the main frame of the harvester, made, preferably, in the general form of a rectangle, with vertical segmental slots in its side bars, through which the main axle C passes to support the driving-wheels D. F F are the driving-pinions, mounted upon a transverse shaft, G, having its bearings in the side pieces of the frame, and in front of the main axle, so that the pinions shall engage with the internal gears of the driving-wheels. G' is the pitman-shaft, having its bearings upon two or more of the cross-rods of the frame, as shown, and provided with a beveled pinion at its upper end to engage with a beveled gear on the pinion-shaft. This arrangement of the gearing in front of the main axle I designate as the gear-center of the machine. H is the finger-bar, hinged in any suitable manner to the rear inner corner of the frame that will admit of the necessary connection of the pitman I with the pitman-shaft and cutter-bar. J is the foot-board, the rear end of which is supported upon the main axle, so as to project forward of the same and form the support for the driver's seat, and a bracket for the attachment of the draft-pole. K is a short bar, pivoted at its lower end to the cross-rod L of the frame, and extending up through a longitudinal slot, M, in the foot-board, and N is a ratchet-clutch, pivoted to the upper end of the rod, so that its teeth shall engage with corresponding teeth O on the upper surface of the foot-board, at each side of the slot.

This rod and clutch-block form the traction-latch by which the entire main frame of the machine is suspended from the foot-board at a point between the main axle and counter-shaft.

The main axle is provided with pinions P, near each end, and with a hand-lever, Q, near one of the driving-wheels. By operating this lever the pinions are engaged with racks R, within the shortest radius of the segmental slots, for the purpose of raising and lowering the frame to elevate or depress the cutting apparatus.

When the lever is pulled rearward, the frame is lifted up, which movement thrusts the traction-latch upward and forward along the foot-board rack, the gravity of the clutch-block causing it to engage with the rack at any point when the lever is released.

To lower the frame the lever is first pulled slightly to the rear, in order to release the clutch-block, and transfer the weight of the frame to the hand-lever through the medium of the segment-racks and axle-pinions, so that the operator has the frame fully under his control, and gradually lowers it by letting the lever go forward until the proper point is reached, when the clutch-block is engaged with the foot-board rack, and the weight of the frame again transferred to the traction-latch.

The segmental slots in the side bars allow the frame to rise and fall freely when the machine is in operation, the axle turning for this purpose after the manner of a rock-shaft. The frame is consequently suspended by the traction-latch, and allowed to rise and fall or oscillate thereon by means of the segmental slots and rocking axle. When, therefore, the rear end of the frame comes in contact with a stone or other obstacle, it will readily rise up and move over the same without stopping the machine. The further the traction-latch is thrown forward, when the machine is used as a harvester, the higher the rear end of the frame and cutter-bar will be raised from the ground to regulate the height of cut, and restore the weight of the frame to the front of the axle, for the purpose of increasing the traction of the driving-wheels. The restoration of the weight of the frame to the prime mover is also effected by the forward throw of the latch when the machine is used as a mower without raising the rear end of the frame from the ground. By adjusting the traction-latch forward or back when the cutter-bar rests upon the ground, the latter is made to bear upon the ground with greater or less pressure, and the points of the guard-fingers turned either up or down to the requisite degree. The friction of the cutter-bar upon the ground is lessened by the downward pull of the driving-wheels upon the driving-pinions F, for it will be observed that these pinions are in front of the suspension point of the main frame, and that the segmental slots in the latter describe an arc, whose radius is from the center of the pinion to the outer side of such slot. The frame is therefore more evenly balanced. When it is desired to use the devices thus far described in harvesting grain instead of mowing, it becomes necessary to hold the front of the main frame down for the purpose of raising the rear end and cutting mechanism sufficiently to cut the grain at the requisite height. For this purpose I employ a notched detent, S, pivoted at its lower end to the front cross-bar of the main frame, so as to project upward through a slot, T, in the foot-board, as shown. This slot is provided with a transverse pin, U, to enter the notches in the detent, so that when the front end of the frame is lowered the detent and pin shall hold it at the requisite distance from the foot-board. The several notches in the detent admit of this distance being adjusted to regulate the position of the cutter-bar, and therefore determine the height of cut. While the detent holds the rear end of the frame from dropping down, it does not prevent the same from rising over stones and other obstructions, because the notches in such detent open upward. The rising movement of the frame at the rear end under these conditions, depresses the front end, and the detent drops down from the pin.

The detent may be used with the mowing-machine, if desired; not for the operation of the machine however, but to hold up the cutter-bar when the machine is being transported from place to place.

Having thus described my invention, what I claim as new is—

1. The main frame of a harvesting-machine suspended from the foot-board or tongue-bracket by means of a traction-latch pivoted to the frame at a point between the main axle and counter-shaft, substantially as described.

2. The main frame of a harvesting-machine suspended from the foot-board or tongue-bracket by means of an adjustable traction-latch pivoted to the frame at a point between the main axle and counter-shaft, substantially as described, for the purpose specified.

3. The traction-latch adapted for adjustment upon the foot-board or tongue-bracket by means of the ratchet-clutch and the ratcheted slot in the foot-board, substantially as described.

4. In combination with the main frame of a harvesting-machine suspended from the foot-board or tongue-bracket by the traction-latch at a part between the main axle and counter-shaft, an adjustable detent for the purpose of holding the frame and finger-bar at the requisite height for cuttting grain, substantially as described.

WM. F. COCHRANE.

Witnesses:
MELVILLE CHURCH,
N. K. ELLSWORTH.